United States Patent [19]
Stites
[11] 3,768,023
[45] Oct. 23, 1973

[54] PULSE WIDTH DISCRIMINATOR USING DIFFERENCE AMPLIFIERS AND THRESHOLD SETTING MEANS

[75] Inventor: Francis H. Stites, Wayland, Mass.
[73] Assignee: Servo Corporation, Hicksville, N.Y.

[22] Filed: Apr. 14, 1972
[21] Appl. No.: 244,307

Related U.S. Application Data

[62] Division of Ser. No. 138,682, April 29, 1971, Pat. No. 3,689,898.

[52] U.S. Cl. .......... 328/111, 328/115
[51] Int. Cl. .......... H03k 5/20
[58] Field of Search .......... 307/232, 234; 328/111, 112, 115–117

[56] References Cited

UNITED STATES PATENTS

| | | | |
|---|---|---|---|
| 3,122,847 | 2/1964 | Huey | 307/234 X |
| 3,226,570 | 12/1965 | Rosenbaum | 307/234 X |
| 3,315,168 | 4/1967 | Cantella | 307/234 X |
| 3,328,602 | 6/1967 | Taylor | 328/111 X |

*Primary Examiner*—Stanley D. Miller, Jr.
*Attorney*—David S. Kane et al.

[57] ABSTRACT

An information processing system in which data is encoded in labels having an array of stripes arranged in a plurality of selected stripe-pair code combinations; the first stripe of each pair being an orange, blue or white retroreflective stripe and the second stripe of each pair being an orange, blue, or white retroreflective stripe or a black nonretroreflective stripe. The stripes are scanned by a beam of light and the reflected light from the retroreflective stripes is employed to generate pulse signals representative of the data encoded in the label. The pulse signals generated by the scanning of the first stripe of a stripe-pair are stored in a first set of flip-flops and the pulse signals, if any, generated by the scanning of second stripe of a stripe-pair are stored in a second set of flip-flops. To load the pulse signals corresponding to the first stripe of a stripe-pair, a control signal to the first set of flip-flops, for enabling the pulse signals to be loaded therein, is produced by first loading circuitry in response to the leading edge of a pulse signal as the stripe-pair is scanned. To load the pulse signals corresponding to the second stripe of a stripe-pair, a control signal to the second set of flip-flops, for enabling the pulse signals to be loaded therein, is produced by second loading circuitry only if the pulse signals occur a predetermined period after the leading edge of a pulse signal derived from the first stripe of a stripe-pair. The predetermined period (15 microseconds) is equal to the maximum width of a pulse signal generated by a single stripe, and therefore causes pulse signals generated by the scanning of the second stripe of a stripe-pair to be loaded into the second set of flip-flops. The second loading circuitry includes a first difference circuit to which the various pulse signals are applied. The pulse signals are also delayed by 15 microseconds and applied to the first difference circuit. The output of the first difference circuit is the difference between the pulse signals and the delayed pulse signals. The pulse signals and the output of the first difference circuit are applied to a second difference circuit. Thus, the second difference circuit produces an output pulse during the period the second stripe of a stripe-pair is being scanned, but only if the second stripe is reflective. This output pulse is coupled to the second set of flip-flops for causing pulse signals generated by scanning of the second stripe to be loaded therein.

2 Claims, 3 Drawing Figures

PULSE WIDTH DISCRIMINATOR USING DIFFERENCE AMPLIFIERS AND THRESHOLD SETTING MEANS

CROSS-REFERENCE TO RELATED APPLICATION

This application is a division of U.S. Pat. application Ser. No. 138,682, filed Apr. 29, 1971, now U.S. Pat. No. 3,689,898, and assigned to the assignee of the present application.

BACKGROUND OF THE INVENTION

This invention relates to information processing systems. More particularly, it is concerned with electro-optical systems useful, for example, in reading labels affixed to and identifying transportation vehicles.

An electro-optical label reading system is described in U.S. Pat. No. 3,225,177 issued to Francis H. Stites and Raymond Alexander entitled "Mark Sensing" and assigned to the assignee of the present application. The system described in the patent is operative to read coded labels affixed to vehicles passing a scanning station and to decode the data content of these labels in order to ascertain the identity of the vehicles passing the scanning station. The labels are fabricated of stripes of colored retroreflective and black non-retroreflective material. Data is encoded in the labels in a two-position base-four code format by various two-stripe combinations of orange, blue, and white retroreflective and black non-retroreflective stripes to represent START and STOP control words and any selected decimal digits, 1 through 0. These stripes are of substantially equal width and are mounted in a vertical succession of horizontally oriented stripes on the side of the vehicle, each two-stripe combination being separated from adjacent ones by a black spacer stripe. An important feature of the particular code employed is the use of black non-retroreflective stripes as one of the four stripes of the code. The black stripes are used only as a second stripe in the two stripe combinations because the system employs electrical pulses which are initiated by light reflected from the first stripe of every two-stripe combination, and the black stripes are essentially non-reflective.

To read a label passing a scanning station, a source of light at the scanning station is vertically scanned from bottom to top across the label, and light reflected from the label is received by the scanner and divided by a dichroic optical system into two light beams which are received by respective photosensors. One photosensor is responsive to orange light, while the other is responsive to blue light. Thus, the respective orange and blue photosensors are activated by light reflected from the orange and blue label stripes, and since light reflected from the white stripes includes both orange and blue components, both photosensors are activated by light reflected from the white stripes. Neither photosensor is activated when a black non-reflective stripe is scanned.

Output signals from the orange and blue photosensors are converted to standardized pulses by respective standardizer circuits. Logic circuitry operates in response to the standardized pulses from the standardizer circuits to sample the standardized pulses by means of appropriately timed loading, or "sampling," signals which cause the pulses to be loaded selectively into a plurality of buffer flip-flops. A first sample is taken at a first fixed period of time after the occurrence of the leading edge of a pulse derived from the first stripe of a stripe-pair in order to produce a first loading signal to load into the appropriate flip-flops the pulses derived from the first stripe of the stripe-pair. A second sample is taken at a second fixed period of time after the first sample in order to produce a second loading signal to load into the appropriate flip-flops the pulses derived from the second stripe of the stripe-pair. The timing of the second sample relative to the first sample is selected to coincide with the center of a pulse that would be produced by scanning the second stripe of a stripe-pair when the stripe-pair is at a predetermined distance from the scanning unit. After standardized pulses corresponding to a stripe-pair have been stored in the buffer flip-flops, they are shifted into a plurality of shift registers. When data derived from all the stripe-pairs of a label has been stored in the shift registers, the accumulated data is transferred to readout apparatus for further processing.

A system employing a modifications of the above described logic circuitry is disclosed in U.S. Pat. application Ser. No. 865,661, filed Oct. 13, 1969, by Christos B. Kapsambelis, Thomas P. Morehouse, Robert H. Reif, and Francis H. Stites entitled "Signal Processing System" and assigned to the assignee of the present application. In this system both the leading and trailing edges of pulses are employed to determine if the pulses meet certain pre-established criteria for authentic data pulses and to generate loading signals for loading the pulses into the appropriate buffer flip-flops.

SUMMARY OF THE INVENTION

The system in accordance with the present invention determines whether signals produced in response to scanning a stripe-pair occur for less than a predetermined period, indicating that the stripe-pair being scanned consists of a first colored reflective stripe and a second non-reflective black stripe, or persists for more than the predetermined period, indicating that both stripes of the stripe-pair are colored reflective stripes. The presence of a signal after the predetermined period is employed to generate a loading signal for loading signals corresponding to the second stripe into appropriate buffer flip-flops.

The system employs a plurality of code elements, such as stripes, associated with an object and arranged in a predetermined coded pattern to represent information relating to the object. The code elements are arranged in pairs, some of the pairs including a first element capable of being sensed, as by virtue of being capable of reflecting incident electromagnetic radiation, and a second element not capable of being sensed. Both elements of other pairs of code elements are capable of being sensed.

Information encoded in the code elements is sensed by information sensing means which produces a first pulse signal in response to sensing the first element of a pair of elements having a second element which is not capable of being sensed. The information sensing means produces a first pulse signal in response to sensing the first element and a second pulse signal in response to sensing the second element of a pair of elements having a second element which is capable of being sensed.

The system includes a first gating circuit means which operates in response to a first pulse signal to produce a first gating signal within the period of occurrence of the first pulse signal.

The system also includes a second gating circuit means which receives pulse signals from the information sensing means. The second gating circuit means deletes that portion of the pulse signals occurring during the period after the leading edge of a first pulse for a duration equal to the maximum allowable duration of a first pulse signal. In response to the presence of a remaining portion of the pulse signals after deleting the first-mentioned portion, the second gating circuit means produces a second gating signal during the remaining portion.

Included in the second gating circuit means as described above is a means for providing pulse signals which are delayed for a duration equal to the maximum allowable duration of a first pulse signal. A first subtraction means subtracts the delayed pulse signals from the pulse signals thereby providing an output pulse coinciding with the first pulse signals. A second subtraction means subtracts the output pulses of the first subtraction means from the pulse signals thereby providing the second gating signals only during the occurrence of a second pulse signal.

A first data storage means is coupled to the information sensing means and to the first gating circuit means. Data represented by first pulse signals from the information sensing means is stored in the first data storage means in response to a first gating signal from the first gating circuit means.

Similarly, a second data storage means is coupled to the information sensing means and to the second gating circuit means. Data represented by second pulse signals from the information sensing means is stored in the second data storage means in response to a second gating signal from the second gating circuit means.

An embodiment of the second gating circuit means of the system, in effect, is an apparatus for detecting a pulse of width greater than a predetermined width. That is, it detects the presence of a pulse persisting for a predetermined period equal to the maximum allowable duration of a first pulse signal. The apparatus includes an input signal terminal for receiving signal pulses. A delay means for providing a delay of the predetermined width is connected to the input signal terminal. The apparatus also includes two difference means each of which operates to produce an output signal at its output terminal representative of the difference between the input signals at its first and second input terminals. The first input terminal of the first difference means is connected to the input signal terminal and the second input terminal is connected to the delay means. Thus, the presence of a signal pulse at the input signal terminal causes a pulse having a width no greater than the predetermined delay to be produced at the output terminal of the first difference means. The first input terminal of the second difference means is connected to the input signal terminal and the second input terminal is connected to the output terminal of the first difference means. Thus, an output pulse occurs at the output terminal of the second difference means subsequent to the predetermined delay only if the applied signal pulse is of width greater than the delay.

BRIEF DESCRIPTION OF THE DRAWINGS

Additional objects, features, and advantages of an information processing system in accordance with the invention will be apparent from the following detailed discussion together with the accompanying drawings wherein.

DETAILED DESCRIPTION OF THE INVENTION

Figure 1:
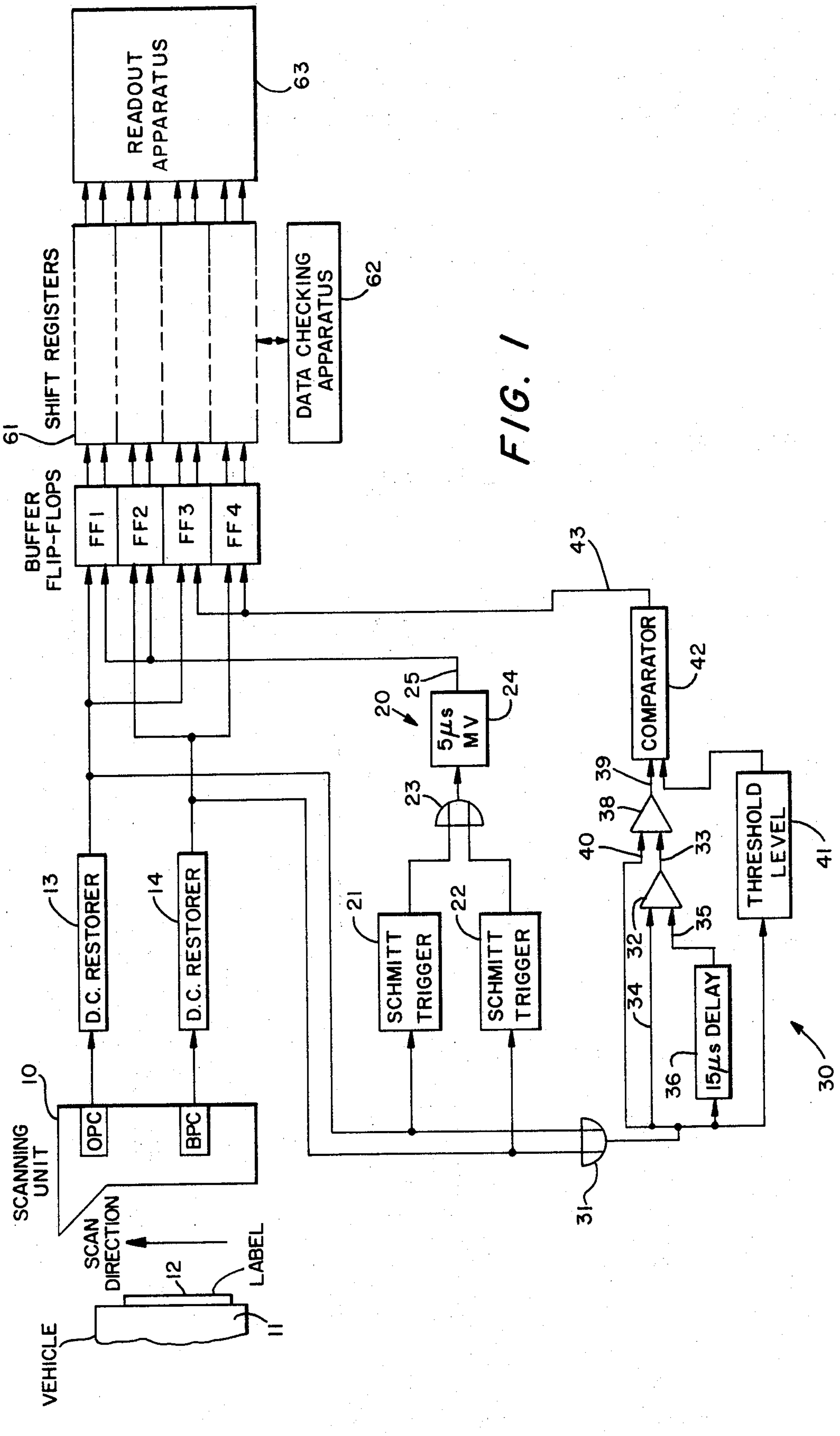
FIG. 1 is a block diagram of an information processing system according to the invention.
Figure 2:
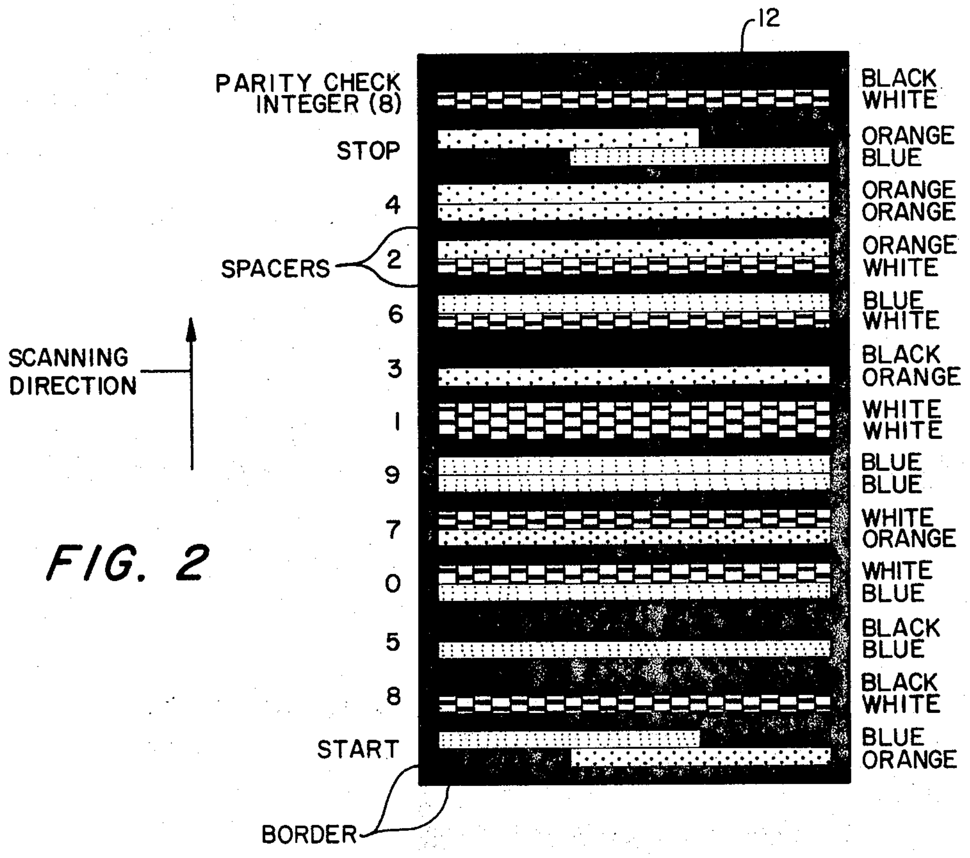
FIG. 2 is a representation of an exemplary label of the type previously described and which is employed in the information processing system of FIG. 1.

A block diagram of a coded vehicle identification system is illustrated in FIG. 1. The apparatus includes a scanning or information sensing unit 10 for vertically scanning a light beam across a coded retroreflective label 12 affixed to the side of a vehicle 11. An exemplary form of a label 12 is shown in FIG. 2. The label includes a plurality of orange, blue, and white retroreflective stripes and black non-retroreflective stripes arranged in selected two-stripe code combinations to represent the identity or other information pertaining to the vehicle. The coded retroreflective label 12 is typically fabricated from a plurality of equal width rectangular, orange, blue, and white retroreflective stripes, and non-retroreflective black stripes. The orange, blue, and white retroreflective stripes have the capability of reflecting incident light directed thereon along the path of incidence whereas the black stripes effectively lack such a capability of retroreflection. The label 12, as shown in FIG. 2, is coded in a two-position base-four code format by various two-stripe combinations of the retroreflective orange, blue, and white stripes and the non-retroreflective black stripes to represent desired information pertaining to the vehicle on which the label is affixed. For purposes of illustration only, the label 12 as shown in FIG. 2 is encoded to represent a START control word, a plurality of digits 8507913624, a STOP control word, and a parity check integer (8).

The coded stripe pairs of the label 12 are separated by black non-reflecting spacers and are surrounded on the edges by a black non-reflecting border. The purpose of the nonreflecting spacers is to isolate the stripe-pairs from each other so as to enable processing of the data encoded in the stripe-pairs. In coded vehicle identification systems as presently employed the label stripes are 6 inches long and three-eighth inch in vertical width for each individual stripe, and thus three-fourth inch for each stripe-pair, and the black non-reflecting spacers between the stripe pairs are one-half inch in vertical width.

As a vehicle 11 bearing a coded retroreflective label, such as the label 12 shown in FIG. 2, is presented to the scanning unit 10, the label is scanned vertically from bottom to top by light from the scanning unit 10. Light reflected from the label 12 is returned to and received by the scanning unit 10 and selectively converted into coded electrical signals representative of the information encoded in the label 12. The return light is separated into its "orange" and "blue" components by optics within the scanning unit 10 and applied to orange responsive and blue responsive photocells OPC and BPC, respectively. In response to an orange stripe being scanned, the orange responsive photocell OPC operates to produce an output signal, and in response to a blue stripe being scanned, the blue responsive photocell BPC operates to produce an output signal. In response to a white stripe being scanned, both of the photocells OPC and BPC operate simultaneously to produce respective output signals (white retroreflected light includes both an "orange" component and a "blue" component). In response to a black non-retroreflective stripe being scanned, neither of the photocells OPC and BPC operates to produce an output signal.

The portion of the vehicle identification system as described briefly hereinabove is described in greater detail in the aforementioned patent to Stites and Alexander.

The signals from the orange photocell OPC pass through a DC restorer 13 and signals from the blue photocell BPC pass through a DC restorer 14 to provide a constant DC base level for all pulse signals. The DC restorer circuits 13 and 14 may be of the type described and claimed in U.S. Pat. No. 3,328,590 entitled "Automatic Gain Control for Ambient Light Effects" issued to Christos B. Kapsambelis and assigned to the assignee of the present application.

The electrical pulses from the DC restorer circuits 13 and 14 are applied to appropriate buffer flip-flops FF1–FF4 where they are temporarily stored prior to further processing in the system. The first flip-flop FF1 stores data indicating the presence or absence of an "orange" signal from the first stripe of a stripe-pair, and the second flip-flop FF2 stores data indicating the presence of absence of a "blue" signal from the first stripe of a stripe-pair. The third flip-flop FF3 stores data indicating the presence or absence of an "orange" signal from the second stripe of a stripe-pair, and the fourth flip-flop FF4 stores data indicating the presence or absence of a "blue" signal from the second stripe of a stripe-pair.

The buffer flip-flop FF1–FF4 are controlled by appropriate control signals from first and second loading circuitry 20 and 30 so as to insure that the proper data is loaded into the flip-flops. That is, the first loading circuitry 20 causes data to be loaded into the first and second flip-flops FF1 and FF2 within the period that a first stripe of a stripe-pair is being scanned; and the second loading circuitry 30 causes data to be loaded into the third and fourth flip-flops FF3 and FF4 within the period that a second stripe of a stripe-pair is being scanned.

The factors of stripe width, scanning speed, and distance between scanning unit and label primarily determine the period of time during which a stripe is being scanned and consequently the duration of the "orange" and "blue" pulses. In a typical system the pulse width for each stripe scanned is between 8 and 15 microseconds. Thus, if a signal persists beyond 15 microseconds, it is being generated by the second stripe of a stripe-pair. In order to insure that proper data is being loaded into the buffer flip-flops, the first loading circuitry 20 must provide a control signal to the first and second flip-flops FF1 and FF2 within 8 microseconds of the leading edge of a signal generated by scanning a stripe-pair. The second loading circuitry 30 must provide a control signal to the third and fourth flip-flops FF3 and FF4 no sooner than 15 microseconds after the leading edge of a signal generated by scanning a stripe-pair, that is, if the second stripe of the stripe pair is reflective.

The first loading circuitry 20 for controlling the loading of pulse data into the first and second flip-flops FF1 and FF2 includes two Schmitt trigger circuits 21 and 22 connected to the DC restorers 13 and 14, respectively. One, or the other, or both of the Schmitt trigger circuits, depending upon the color of the stripe, is triggered when a predetermined threshold level is reached by the leading edge of a signal pulse. The output of each Schmitt trigger circuit is connected to an OR gate 23 and the output of the OR gate is connected to a monostable multivibrator 24. The monostable multivibrator 24 triggers on receipt of the leading edge of a pulse from either or both of the Schmitt trigger circuits to produce an output pulse of, for example, 5 microseconds duration on line 25. Line 25 is connected to the first and second buffer flip-flops FF1 and FF2, and the presence of a pulse on the line loads the "orange" and/or "blue" data pulses from the DC restorers 13 and 14 into the flip-flops. The 5 microsecond pulse terminates less than 8 microseconds after the leading edge of the pulse generated by scanning the first stripe of a pair of stripes, and therefore only data pertaining to the first stripe is loaded into the first and second flip-flops FF1 and FF2. If both the first and second stripes of a stripe-pair are refective, the output signal from the OR gate 23 continues during scanning of the second stripe, thereby preventing the monostable multivibrator from being retriggered until the leading edge of the pulse generated by the first stripe of the next succeeding stripe-pair.

The second loading circuitry 30 for controlling the loading of data into the third and fourth buffer flip-flops FF3 and FF4 is connected to the output 37 of an OR gate 31 which has its inputs connected to the DC restorers 13 and 14. The second loading circuitry employs a first difference circuit 32 which produces a signal at its output 33 representative of the difference between the signal applied at its first input 34 and that applied at its second input 35. The difference circuit may be any of various well known types of conventional operational amplifiers employing appropriate feedback connections.

The loading circuit also includes a delay 36 which delays signals transmitted therethrough by 15 microseconds. This period of delay is equal to the maximum width of a pulse generated by scanning the first stripe of a stripe-pair. A second difference circuit 38, similar to the first difference circuit 32, has a first input 40 connected to the output of the OR gate 31 and a second input connected to the output 33 of the first difference circuit 32. A threshold level setting circuit 41 has its input connected to the output 37 of the OR gate 31 and its output connected to a comparator circuit 42. The output 39 of the second difference circuit 38 is also connected to the comparator 42. The output of the comparator 42 is connected to the third and fourth buffer flip-flops FF3 and FF4 by line 43 to control the loading of data into the flip-flops.

Figure 3:
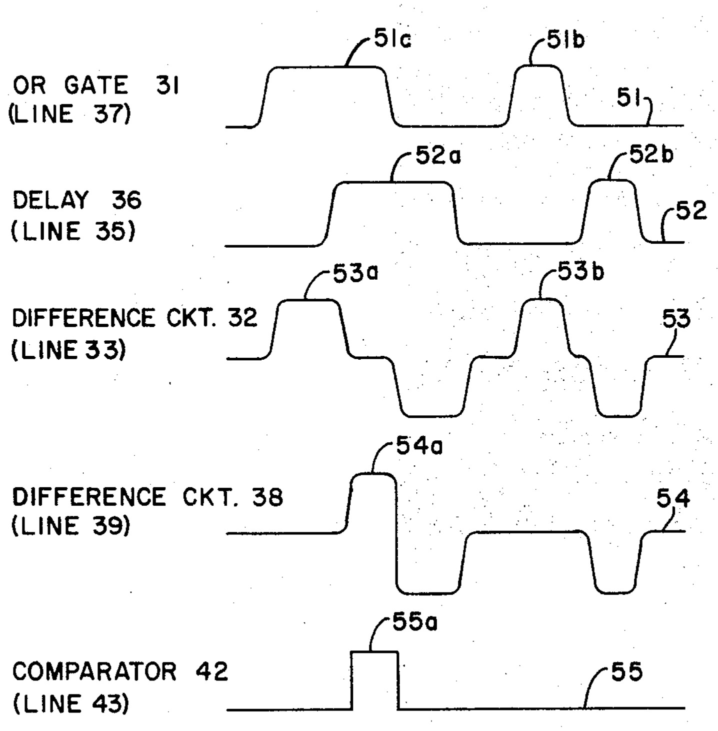
FIG. 3 is a set of curves illustrating signals present at various points in the system of FIG. 1 during operation of the system.

The operation of the second loading circuitry 30 may best be understood by reference to curves 51–55 of FIG. 3. The curve 51 illustrates the signals occuring at the output 37 of the OR gate 31 during the scanning of two successive stripe-pairs of a label. The first pulse **51*a* of curve 51 is produced by scanning a pair of stripes having two reflective stripes, and the second pulse 51b is produced by scanning a stripe having a first reflective stripe and a second nonreflective black stripe. The signals represented by the curve 51 are applied directly from the output 37 of the OR gate 31 to the first input 34 of the first difference circuit 32. The signals are also applied to the delay 36 which delays the signals 15 microseconds. The delayed signals (curve 52) are applied to the second input 35 of the first difference circuit 32. As shown in curve 53 the resulting signals at the output 33 of the first difference circuit 32 are the difference between the signals of curve 51 and curve 52. Output pulses 53***a* and 53*b* do not presist beyond 15 microseconds after the leading edge of a pulse signal generated by scanning a stripe-pair.

The signals of curve 51 are also applied directly to the first input 40 of the second difference circuit 38, and the signals of curve 53 at the output 33 of the first difference circuit 32 are applied at the second input to the second difference circuit 38. The resulting signals at the output 39 is the difference between the two input signals as shown in curve 54. A pulse 54*a* is produced having a leading edge occurring 15 microseconds after the leading edge of pulse 51*a*. Thus pulse 54*a* occurs while the second stripe of the stripe-pair is being scanned. Also, as can be seen from curve 54, if the second stripe of a stripe-pair is non-reflective, pulse 53*b* cancels pulse 51*b* and no pulse is produced at the output 39 of the second difference circuit 38.

In order to reduce the effects of noise, the output of the second difference circuit 38 is compared with the output of the threshold level setting circuit 41 by the comparator circuit 42. The threshold level setting circuit 41 is set to provide an output signal at a desired level above the no-signal noise level present at the output 37 from the OR gate 31. Thus, the comparator circuit 42 does not produce a pulse 55a on line 43 during the period the second stripe of a stripe-pair is being scanned unless the pulse 54*a* from the second difference circuit exceeds the threshold level. The pulse 55*a* on line 43 causes "orange" and/or "blue" signal pulses from the DC restorer circuits 13 and 14 to be loaded into the third and fourth flip-flops FF3 and FF4.

Thus, the data encoded in a pair of stripes of the label is stored in the appropriate buffer flip-flops while the stripes are being scanned by the beam of light of the scanning unit. The data is removed from the buffer flip-flops FF1-FF4 and shifted through the stages of four shift registers 61 in the general manner described, for example, in the aforementioned patent to Stites and Alexander. After the data of an entire label has been loaded into the shift register 61, it may be analyzed for completeness and accuracy by suitable data checking apparatus 62. The data checking apparatus may employ any of various known techniques, such as identifying the presence of the START and STOP words in the proper register stages and checking the accumulated data against the parity check integer in accordance with a particular parity checking scheme. The accumulated and verified data may then be read out from the shift registers 61 to appropriate readout apparatus 63 depending upon the utilization to be made of the data encoded in the label.

While there has been shown and described what is considered a preferred embodiment of the present invention, it will be obvious to those skilled in the art that various changes and modifications may be made therein without departing from the invention as defined in the appended claims.

What is claimed is:

1. Apparatus for detecting a pulse of width greater than a predetermined width including an input signal terminal for receiving signal pulses;

delay means connected to said input signal terminal for providing a predetermined delay equal to the predetermined width;

first difference means having first and second input terminals and an output terminal, said first difference means being operable to produce an output signal at its output terminal representative of the difference between the input signals at its first and second input terminals;

the first input terminal of the first difference means being connected to the input signal terminal and the second input terminal being connected to the delay means; whereby the presence of a signal pulse at the input signal terminal causes a pulse having a width no greater than the predetermined delay of the delay means to be produced at the output terminal of the first difference means;

second difference means having first and second input terminals and an output terminal, said second difference means being operable to produce an output signal at its output terminal representative of the difference between the input signals at its first and second input terminals;

the first input terminal of the second difference means being connected to the input signal terminal and the second input terminal of the second difference means being connected to the output terminal of the first difference means; whereby an output pulse occurs at the output terminal of the second difference means subsequent to the predetermined delay only if the applied signal pulse is of width greater than the delay.

2. Apparatus in accordance with claim 1 including threshold level setting means connected to the input signal terminal for establishing a threshold level greater than the level present at the input signal terminal during the absence of signal pulses thereat; and comparator means connected to the output terminal of the second difference means and to the threshold level setting means and having an output terminal, said comparator means being operable to produce an output signal at its output terminal when the output signal from the second difference means exceeds the threshold level from the threshold level setting means.

* * * * *